United States Patent
Lindoff et al.

(10) Patent No.: US 8,687,599 B2
(45) Date of Patent: Apr. 1, 2014

(54) METHOD AND DEVICE FOR MEASURING A RECEIVED SIGNAL POWER IN A MOBILE COMMUNICATION SYSTEM

(75) Inventors: Bengt Lindoff, Bjärred (SE); Joakim Axmon, Kävlinge (SE); Jose Flordelis, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 139 days.

(21) Appl. No.: 13/260,724

(22) PCT Filed: Mar. 25, 2010

(86) PCT No.: PCT/EP2010/053918
§ 371 (c)(1),
(2), (4) Date: Dec. 19, 2011

(87) PCT Pub. No.: WO2010/112398
PCT Pub. Date: Oct. 7, 2010

(65) Prior Publication Data
US 2012/0087264 A1    Apr. 12, 2012

Related U.S. Application Data

(60) Provisional application No. 61/167,573, filed on Apr. 8, 2009.

(30) Foreign Application Priority Data

Apr. 3, 2009   (EP) .................................... 09157319

(51) Int. Cl.
*H04W 4/00*    (2009.01)

(52) U.S. Cl.
USPC ............................. 370/332; 370/311; 455/436

(58) Field of Classification Search
USPC ........................ 370/252, 328, 331, 332, 311; 455/436–444

See application file for complete search history.

(56) References Cited

U.S. PATENT DOCUMENTS 6,009,332 A      12/1999  Haartsen
2005/0135308 A1*  6/2005  Vijayan et al. ................ 370/330
(Continued)

FOREIGN PATENT DOCUMENTS

EP    0 625 863 A2    11/1994
EP    0 920 143 A1     6/1999
(Continued)

OTHER PUBLICATIONS

PCT International Preliminary Report on Patentability, mailed Oct. 13, 2011, in connection with International Application No. PCT/EP2010/053918.

(Continued)

*Primary Examiner* — Paul H Masur
(74) *Attorney, Agent, or Firm* — Potomac Patent Group PLLC (57) ABSTRACT

In a method and a mobile communications receiver for performing signal measurements, signal measurement data is received from at least one base station during at least part of a measurement period. Each measurement period comprises a number of non-equidistant snapshot measurement windows during which the receiver receives signal measurement data. At least one average signal strength value of the signal measurement data received during the measurement period is computed.

10 Claims, 5 Drawing Sheets

(56) References Cited

U.S. PATENT DOCUMENTS

2007/0076668 A1* 4/2007 Tirkkonen et al. ............ 370/335
2009/0052561 A1* 2/2009 Baxley et al. ................. 375/260
2009/0232230 A1* 9/2009 Hung et al. ................... 375/260

FOREIGN PATENT DOCUMENTS

GB       2 316 836 A      3/1998
WO       95/25365 A2      9/1995
WO       2007/062933 A1   6/2007

OTHER PUBLICATIONS

PCT International Search Report, mailed May 31, 2010, in connection with International Application No. PCT/EP2010/053918.
3GPP Technical Specification TS 36.211, V8.6.0, Technical Specification Group Radio Access Network; Evolved Universal Terrestrial Radio Access (E-UTRA); Physical Channels and Modulation, Release 8, Mar. 2009.

* cited by examiner

METHOD AND DEVICE FOR MEASURING A RECEIVED SIGNAL POWER IN A MOBILE COMMUNICATION SYSTEM

CROSS-REFERENCE TO RELATED APPLICATIONS

This application claims priority under 35 U.S.C. §119 to European Patent Application No. 09157319.6, filed Apr. 3, 2009, which is hereby incorporated herein by reference in its entirety. This application also claims the benefit of U.S. Provisional Application No. 61/167,573, filed Apr. 8, 2009, which is hereby incorporated herein by reference in its entirety.

TECHNICAL FIELD

The present invention relates to a method and a receiver for performing signal measurements in a mobile communications system.

BACKGROUND

In the forthcoming evolution of present mobile cellular standards like GSM and Wideband Code Division Multiple Access (WCDMA), Orthogonal Frequency Multiple Access (OFDM) will be used for transmission. OFDM promises higher data rates and a more efficient usage of limited bandwidth resources than the presently employed techniques.

Furthermore, to migrate smoothly from the existing cellular systems to new high-capacity, high-data-rate systems in existing radio spectrum, the new systems have to be able to operate with flexible communication channel bandwidths. One such new flexible cellular communication system is called Third Generation Long Term Evolution (3G LTE), which is standardized by the Third Generation Partnership Project (3GPP). The 3G LTE specification can be seen as an evolution of the 3G Wideband Code Division Multiple Access (WCDMA) standard also promulgated by 3GPP.

The 3G LTE system will use OFDM as a multiple access technique (called OFDMA) in the downlink (DL) from system nodes to user equipments (UE) and will be able to operate on bandwidths ranging from 1.4 MHz to 20 MHz. Furthermore, data rates up to 100 Mb/s will be supported for the largest bandwidth channels. Besides high-data-rate services, 3G LTE systems are expected to provide low-data-rate services, such as speech. Since 3G LTE is designed for packet data according to the familiar transmission control protocol/internet protocol (TCP/IP), it is expected that the service that carries speech will use voice-over-IP (VoIP).

To allow an LTE terminal to connect to a suitable serving cell, a mobility function needs to be implemented in an efficient manner. As radio conditions change, e.g. because the user of the terminal moves to a different location, the mobile station needs to be handed over from one serving cell to another.

It is also worth noting that LTE will be deployed gradually in a successive fashion by the mobile operators. Therefore Inter Radio Access Technology (IRAT) mobility from e.g. GSM/WCDMA to LTE will be another important functionality. Mobility from a GSM/WCDMA system to an LTE system is obviously just one of many examples of IRAT mobility.

Cell search procedures and efficient signal power measurements are of major importance to allow the mobile station to find and connect to a suitable cell. At the same time it is important to keep the power consumption down in the mobile station, which makes constant measurement of signal strength a less attractive alternative. Therefore some type of schedule for performing measurements needs to be implemented, so that the mobile station may power down its receiver chain for as much time as possible while still being able to provide updated data for handover decisions and channel estimation to fulfill sufficient performance requirements.

SUMMARY

A method of performing signal measurements in a mobile communications receiver is presented, wherein signal measurement data is received from various cells in non-equidistant snapshot measurement windows during a measurement period. The measurement data received in one measurement period may be averaged to form an indication of the signal strength for a specific cell. This indication may then be used for handover decisions. Having non-equidistant snapshot measurement windows makes it more likely to receive all possible synchronization and reference symbols from different cells during one measurement period, thus improving the quality of the signal strength measurements. Further, the use of shorter snapshot measurement windows is made possible, in turn saving power in the receiver.

Specifically, according to embodiments of the invention, a method of performing signal measurements in a mobile communications receiver comprises the steps of receiving signal measurement data from at least one base station during at least part of a measurement period, computing at least one average signal strength value of the signal measurement data received during the measurement period, wherein each measurement time period comprises a number of non-equidistant snapshot measurement windows during which the receiver receives signal measurement data.

BRIEF DESCRIPTION OF THE DRAWINGS

The invention will be described more fully below with reference to the drawings, in which.

DETAILED DESCRIPTION

The method and apparatus of the present invention makes signal strength measurements in a mobile communication network. Such signal strength measurements may be used to assist and/or direct handover operations. To facilitate the description of various embodiments, the following first provides a general description of an exemplary mobile communication network.

Figure 1:
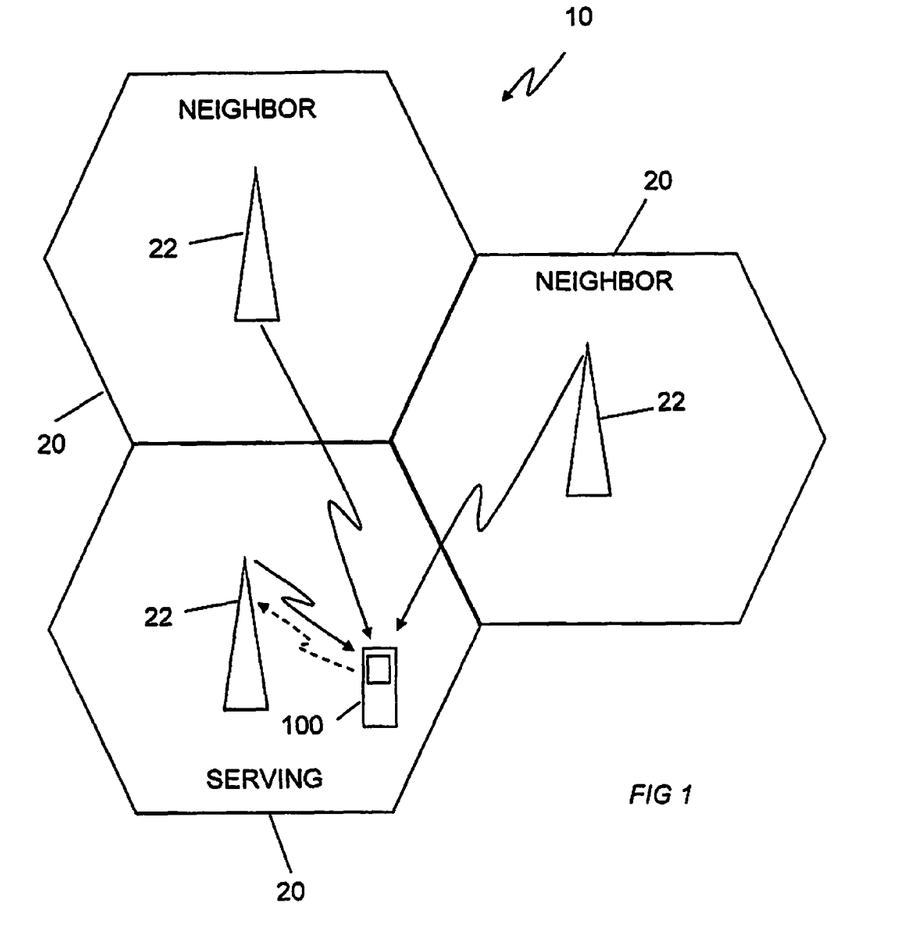
FIG. 1 shows part of a mobile communications system.

FIG. 1 illustrates an exemplary mobile communication network indicated generally by the numeral 10. Mobile communication network 10 may use Orthogonal Frequency Division Multiplexing (OFDM) as the transmission method for downlink transmissions. The geographic area of the mobile communication network 10 is divided into cells 20. The cells 20 may be further divided into sectors. At least one base station 22 is located in each cell 20 for communicating with a mobile station 100 in the cell 20. If the cell 20 is divided into sectors, the cell 20 may include one base station 22 for all sectors, or separate base stations 22 for each sector in the cell 20. To simplify the explanation of the present invention, it is assumed that each cell 20 comprises a single sector with a single base station 22. The principles described may be easily extended to multi-sector cells 20.

Transmissions on the downlink from the base station 22 are indicated with solid lines, while uplink transmissions from the mobile station 100 are indicated with dashed lines. The mobile station 100 exchanges data and control signals with the base station 22 in the serving cell 20 using uplink and downlink transmissions. The mobile stations 100 may also detect downlink transmissions from the base stations 22 in nearby cells 20. The serving cell 20 may provide the mobile station 100 with a neighbor list of the nearby cells 20. Alternatively or additionally, the mobile station 100 may detect one or more nearby cells 20. As the mobile station 100 moves away from the serving cell 20 towards a neighbor cell 20, the signal strength from the serving cell 20 will diminish while the signal strength from the neighbor cell 20 will increase.

The mobile station 100 and/or a controlling entity in the network make handover decisions based on the strength of the serving and neighbor base station signals at the mobile station 100. To that end, the mobile station 100 measures the signal strength of downlink transmissions from the serving and neighbor base stations 22. For mobile-assisted handover, the mobile station 100 sends the measured signal strengths to the serving base station 22, where the network 10 uses the received signal strength measurements to make handover decisions. For mobile-directed handover, the mobile station 100 evaluates the signal strength measurements and requests the network 10 to handover the mobile station 100 to a specific neighbor cell 20 based on the evaluation. For example, when the signal strength from a neighbor base station 22 exceeds the signal strength from the serving base station 22 by a predetermined amount, the mobile station 100 may direct the network 10 to handover control to the higher power neighbor cell 20. After handover, the base station 22 in the newly selected cell 20 begins transmitting data and control signals to the mobile station 100.

It is desirable that the signal strength measurements should reflect some averaged signal strength to reduce the effects of fast fading. In current 3G LTE specifications, handover decisions may be based on measurements of reference signal received power (RSRP), which can be defined as the average received signal power of reference signals or symbols (RS) transmitted by a base station, over a certain time period. A mobile station measures RSRP on its serving cell as well as on neighboring cells that the mobile station has detected as a result of the cell search procedure. Another option is to use the reference signal received quality (RSRQ), which is defined as RSRP divided by the received signal strength indicator (RSSI).

The RS, or pilots, that are used to measure RSRP, are transmitted from each base station at known frequencies and time instants, and are used by mobile stations for synchronization and other purposes besides handover. Such reference signals and symbols are described for example in Sections 6.10 and 6.11 of 3GPP Technical Specification (TS) 36.211 V8.6.0, Physical Channels and Modulation (Release 8), November 2007.

Figure 2:
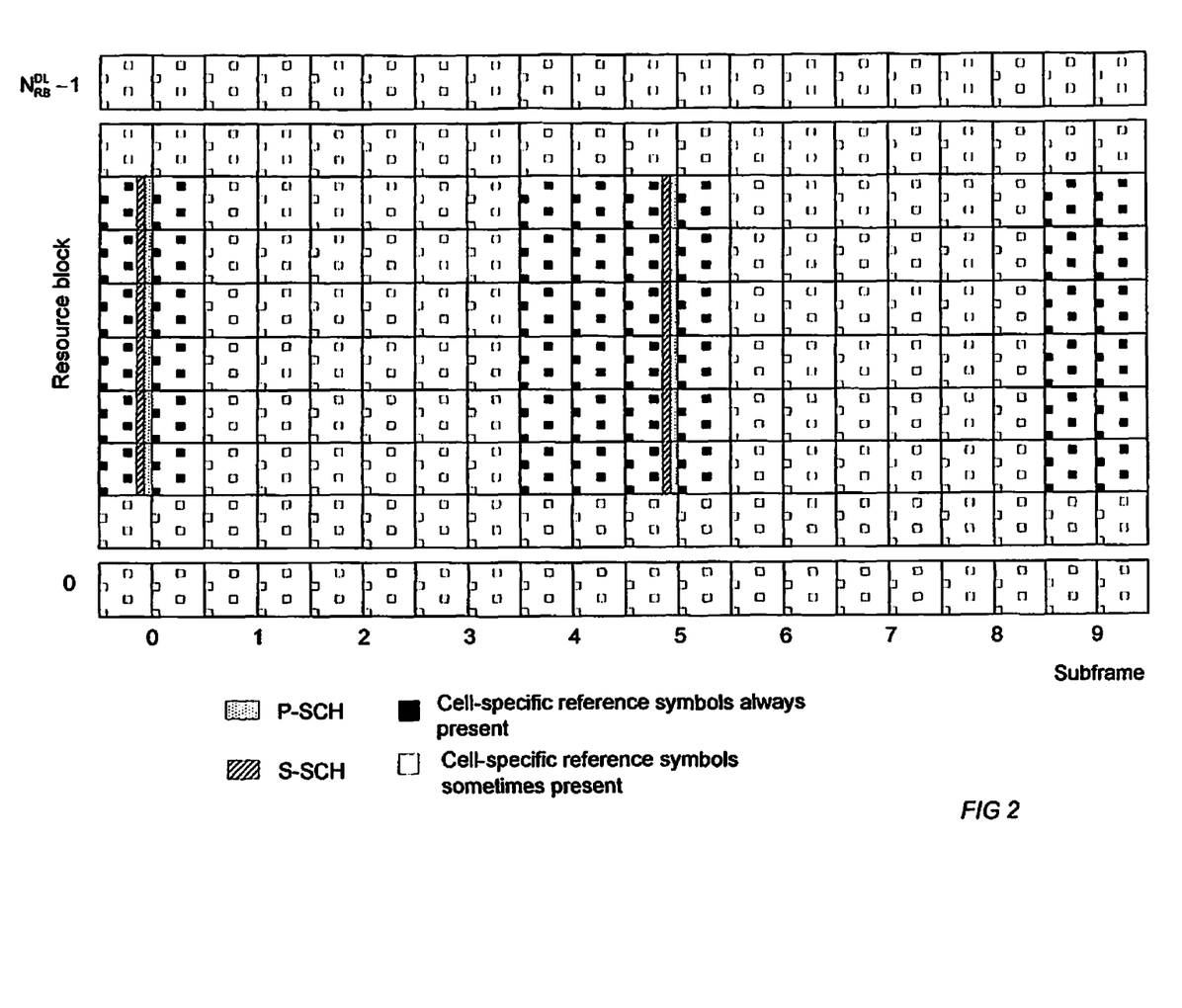
FIG. 2 shows reference symbols and synchronization channels on a time-frequency grid for LTE FDD.

Using LTE Frequency Division Duplex (FDD) mode as an example, the RS as well as the primary and secondary synchronization channels (P-SCH and S-SCH) are transmitted from a base station on particular resource elements (RE) that can be conveniently represented on the frequency-vs.-time plane as depicted in FIG. 2. It may be noted that the sub frame axis in FIG. 2 corresponds to a time axis and the resource block axis corresponds to a frequency axis. It will be understood that the arrangement of FIG. 2 is just an example and that other arrangements can be used.

The positioning of the synchronization and pilot symbols adds a timing aspect to the measurement and cell search procedure. Again using LTE FDD mode as an example, the neighbor cells may have different timings in relation to the serving cell, and, as is shown in FIG. 2, the synchronization symbols on P-SCH (the dotted area in FIG. 2) and S-SCH (the dashed area in FIG. 2) are transmitted every 5 ms (sub-frame 0 and 5). The mobile station needs to be able to detect the synchronization symbols and to measure signal strength on the pilot symbols and therefore the relative timing (relative to the serving cell) that needs to be covered is 5 ms. Further according to the standard specifications, the RS (the ones shown as black squares in FIG. 2) that can be used for measurements are the ones transmitted in sub frames 0, 4, 5 and 9, i.e. 2 ms per 5 ms can be used. As shown in FIG. 2, other RS (the ones shown as white squares in FIG. 2) may also be present, depending on whether the cell is used for multicast/broadcast single frequency network (MBSFN) or if the cell employs UE specific reference symbols, thus, these other RS cannot be expected to always be available.

Now, terminal related Radio Resource Management issues (RRM), i.e. cell search and signal power measurements, typically have some kind of performance requirements. Such requirements may be along the lines of: "the mobile terminal should be able to detect a new cell within a certain time, once the cell has become sufficiently strong (relative to the current serving cell, or compared to a certain SIR level)", or "the accuracy of the signal measurements, measured over a certain time period, should be better than a threshold value, for a sufficiently strong cell". Such requirements typically mean that certain demands are placed on the cell search and signal power measurement rate in the terminal.

Besides the timing and performance issues, hardware and software (HW/SW) complexity aspects in the terminal also need to be taken into account. Power consumption aspects on measurements are also an important issue. For services like VoIP, i.e. small data packets having strict real time and mobility requirements, the time during which the terminal needs to receive data should be as small as possible, to keep power consumption down. It may be noted that a good solution from a HW/SW complexity perspective is often a good solution from a power consumption point of view too.

Figure 3A:
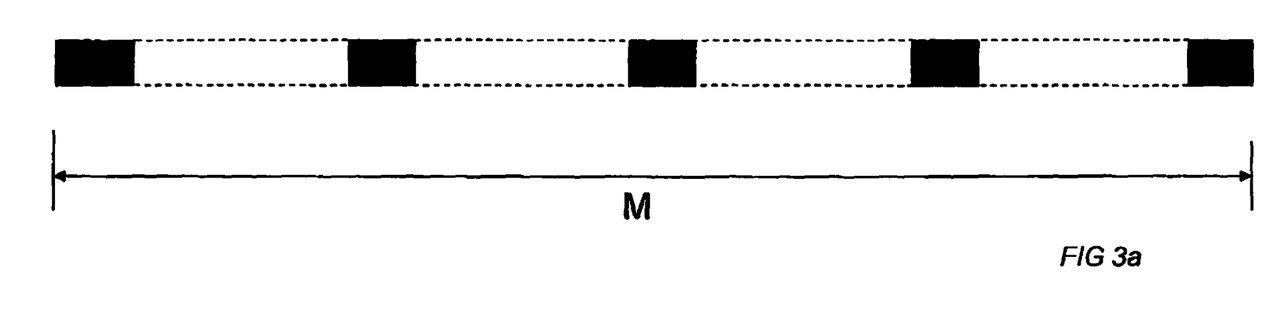
FIGS. 3a and 3b show signal measurement schemes.

To keep hardware cost and power consumption down, while still fulfilling sufficient performance requirements, one solution is to perform signal power measurements and cell search during snapshot measurement windows with regular intervals, as shown in FIG. 3a. As was mentioned above, to reduce the effects of fast fading, measurements taken over one measurement period are averaged to yield an indication of average signal strength. In other words, the length of the measurement period, denoted M, corresponds to a filter constant for an averaging filter.

Only one such measurement period is illustrated in FIG. 3a, but it is apparent that it may be followed by another measurement period, either directly or with a time gap between them. Within each such measurement period, a number of snapshot measurement windows are positioned at regular intervals. During each such snapshot measurement window, a mobile station receiver is powered on to receive data for performing measurements for cell search and signal power estimation purposes. In the intervals between the snapshot measurement windows, the receiver can be switched off to save power in the mobile station. It may be noted that the length M of the measurement period varies depending on the current DRX cycle, which in turn depends on what state the mobile station is currently in, e.g. "connected" (denoted RRC_CONNECTED in LTE terminology) or "idle" (denoted RRC_IDLE in LTE terminology).

Each snapshot measurement window corresponds to the required time for spanning all measurement and cell search timings, including some margin. In LTE this could e.g. mean that 5-6 ms snapshots are taken every, say 20-60 ms. This is likely to yield a reasonable trade-off between performance, SW and HW complexity and power consumption.

For mobile stations in the so called low end segment, i.e. terminals which are designed to be inexpensive to buy and own, low cost and low power consumption are even more important. Then the regular measurements scheme shown in FIG. 3a might not be sufficient e.g. in terms of cost and memory usage.

Figure 3B:
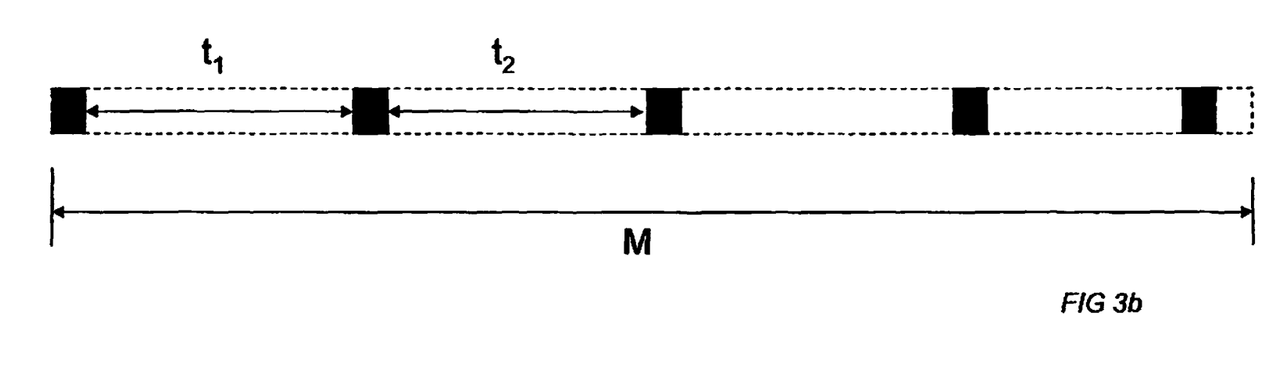

In FIG. 3b a measurement scheme according to embodiments of the present invention is shown which may further reduce the time the receiver has to be powered on and in addition make it possible to reduce the amount of memory needed for storing radio resource management (RRM) data and the time and processing power needed for processing the RRM data. Instead of regular intervals between the snapshot measurement windows, the snapshot measurement windows are non-equidistant, i.e. at least one of the distances between the snapshot measurement windows is different from the other ones. E.g. in FIG. 3b the distance $t_1$ is different from the distance $t_2$.

The non-equal intervals provide an improved coverage of all possible timing differences between cells while keeping the desired measurement performance. This can enable the length of the snapshot measurement windows to be shortened, thus reducing the time during each measurement period that the receiver is on, in turn leading to a possible reduction in power consumption.

One way of describing the manner in which the snapshot measurement windows are laid out within a measurement period, is that the timings of the snapshot measurement windows within a measurement period are such that the distance between the start of at least a first snapshot measurement window and the start of a snapshot measurement window subsequent to said first snapshot measurement window is different from the distance between the start of a snapshot measurement window preceding said first snapshot measurement window and the start of said first snapshot measurement window.

The distances may be predetermined or determined on the fly. They may e.g. be strictly increasing or a randomly chosen, possibly within a certain interval. It is also an option to calculate each distance between the snapshot measurement windows within a measurement period based on the knowledge of all possible timing differences between cells and the positioning of the RS and the P-SCH and S-SCH symbols. This will, at least in theory, ensure that synchronization and reference symbols from all available cells are captured during one measurement period, without having to perform measurements during the entire measurement period.

Alternatively the schedule for snapshot measurement windows within a measurement period could be described by noting that the timings, or the start, of each snapshot measurement window comes with a certain periodicity, but a jitter function adds jitter, or an offset, to at least one of the snapshot measurement window timings.

The offsets may be positive or negative and may be predetermined or determined on the fly. As above they may e.g. be in the form of a strictly increasing function (0.1 ms, 0.2 ms, 0.3 ms etc), or a random number, possibly restricted to a certain interval, or they may be calculated on basis of knowledge regarding possible relative timings between cells and the positioning of the RS and the P-SCH and S-SCH symbols. Just as above, this will, at least in theory, ensure that synchronization and reference symbols from all available cells are captured during one measurement period, without having to perform measurements during the entire measurement period.

Usually, the length of the snapshot measurement windows will be equal within a measurement period, but it may also be instances where it is desirable to use non-equal length windows.

Further, the distances between the snapshot measurement windows may be different for different measurement period lengths. A shorter measurement period may require shorter distances between snapshot measurement windows to capture relevant signal measurement data, while a longer measurement period can tolerate longer distances between snapshot measurement windows. As noted above the length of the measurement periods depends on the state of the mobile station, such as idle or connected, which in turn determines the DRX cycle length.

Figure 4:
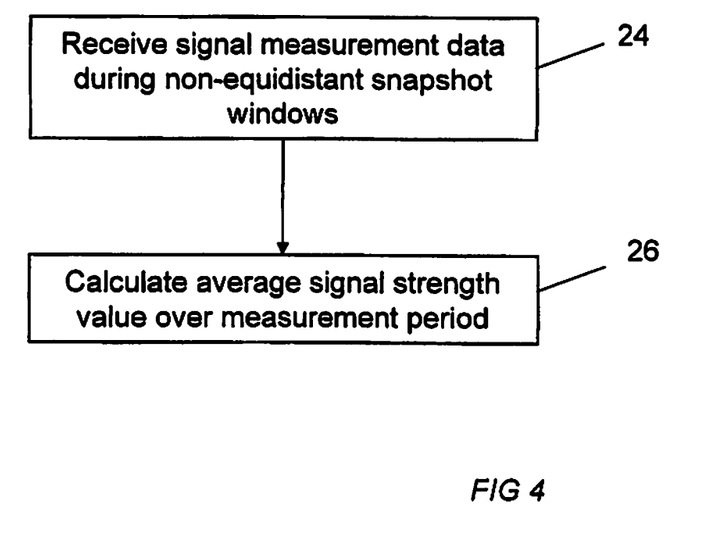
FIG. 4 illustrates a method according to embodiments of the invention.

In FIG. 4 a method according to embodiments of the invention is illustrated. In step 24 signal measurement data is received during the non-equidistant snapshot measurement windows over a measurement period. In step 26 at least one average signal strength value is calculated based on at least part of the received signal measurement data in step 24. The average signal strength value may then be used for handover decisions.

Figure 5:
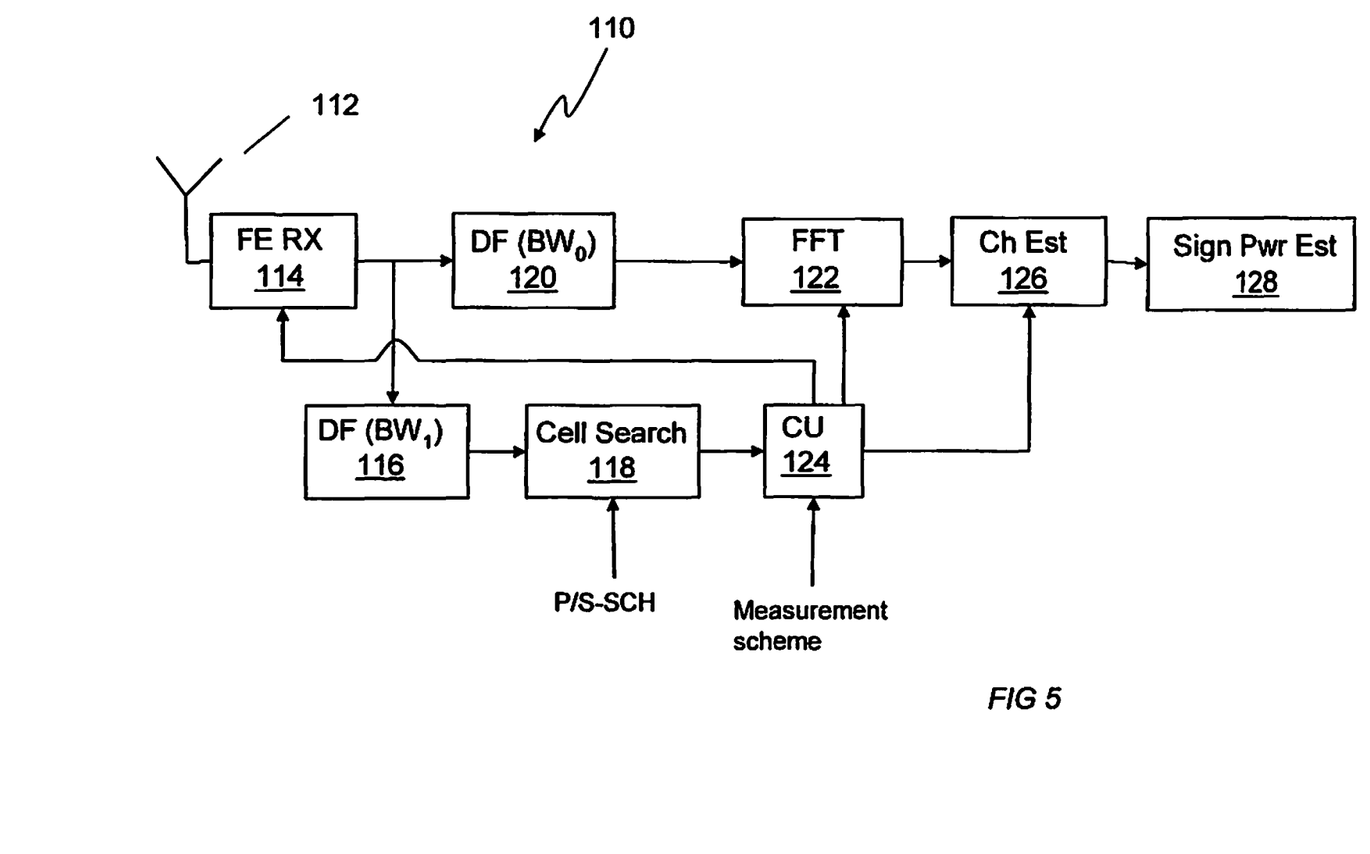
FIG. 5 shows a mobile communications receiver according to embodiments of the invention.

FIG. 5 shows an exemplifying receiver 110 for implementing the above-described signal measurement method. Receiver 110 may be disposed in any mobile station 100. It will be appreciated that the present invention is not limited to the specific arrangement of elements shown in FIG. 5 and that the functional blocks depicted in FIG. 5 can be combined and re-arranged in a variety of equivalent ways, and that many of the functions can be performed by one or more suitably programmed digital signal processors.

As depicted in FIG. 5, a UE receives a radio signal through an antenna 112 and typically down-converts the received radio signal to an analog baseband signal in a front end receiver (Fe RX) 114. In the front end receiver 114 the baseband signal is then spectrally shaped by an analog filter that has a bandwidth $BW_0$, and the shaped baseband signal is converted from analog to digital form by an analog-to-digital converter in a conventional manner.

The digitized baseband signal is further spectrally shaped by a digital filter 116 that has a bandwidth $BW_1$, which corresponds to the bandwidth of synchronization signals or symbols included in the received signal. The shaped signal generated by the filter 116 is provided to a cell search unit 118 that carries out one or more methods of searching for cells as specified for the particular communication system, e.g., 3G LTE. Typically, such methods involve detecting predetermined primary and/or secondary synchronization channel (P/S-SCH) signals in the received signal.

The digitized baseband signal is also provided to a digital filter 120 that has the bandwidth $BW_0$, and the filtered digital baseband signal is provided to a fast Fourier transform (FFT) unit 122 that implements a fast Fourier transform (FFT) or other suitable algorithm that generates a frequency-domain (spectral) representation of the baseband signal.

The cell search unit 118 exchanges suitable timing and other suitable signals with the FFT unit 122 for each candidate cell, i.e., each cell whose signal power (e.g., RSRP) will be measured, via a control unit 124.

The control unit 124 also provides cell identifications and REs corresponding to RSs for each candidate cell to a channel estimation unit 126, which also receives signals from the FFT unit 122 and generates a channel estimate for each of several sub-carriers and cells.

The channel estimation unit 126 then provides channel estimates to a signal power estimation unit 128 that generates signal strength estimates such as estimates of RSRP, reference signal received quality (RSRQ), received signal strength (RSSI), received sub-carrier power, SIR, etc.

It may be noted that for mobile-directed handover, a controller (not shown) in the mobile station 100 makes handover decisions based on the signal strength measurements output by signal power estimation unit 128. For mobile-assisted handover, the mobile station 100 sends the signal strength measurements output by the signal power estimation unit 128 to the serving base station 22. The signal power estimates generated by the estimator 128 are typically also used in further signal processing in the mobile station.

According to embodiments of the invention the control unit 124 controls the receiver front end to power on and off to receive signals during non-equidistant snapshot measurement windows according to a measurement scheme. As explained above, this measurement scheme may be designed based on knowledge about possible relative timings between different cells and the timings of the reference and synchronization symbols, and it may take into account the operating state of the mobile station, such as idle or connected.

It will be appreciated that procedures described above are carried out repetitively as necessary, for example, to respond to the time-varying nature of communication channels between transmitters and receivers.

To facilitate an understanding of the exemplifying embodiments of the invention, many aspects have been described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

It may also be noted that the above discussion is related to a single transmitter/single receiver antenna case, but extension to several transmitter and/or receiver antennas would be straightforward.

Although reference is here made to a receiver in a mobile station, such as a mobile terminal or a user equipment (UE), it should be noted that the methods and apparatus described may be used at any device comprising a telecommunications receiver, e.g. in a laptop or a handheld computer.

Thus, the embodiments disclosed herein are merely illustrative and should not be considered restrictive in any way. The scope of the invention is given by the appended claims, rather than the preceding description, and all variations which fall within the range of the claims are intended to be embraced therein.

The invention claimed is:

1. A method of performing signal strength measurements in a mobile communications receiver, the method comprising:
   receiving signal strength measurement data from at least one base station during at least part of a measurement period, wherein the signal strength measurement data comprises at least one of reference symbols and synchronization symbols;
   computing at least one average signal strength value based on at least part of the signal strength measurement data received during the measurement period,
   wherein each measurement period comprises at least three time-wise non-equidistant measurement windows during which the receiver receives signal strength measurement data; and
   wherein a length of the measurement period is determined based on a state of the mobile communications receiver.

2. The method of claim 1, wherein the synchronization symbols are received on at least one of a primary synchronization channel (P-SCH) and a secondary synchronization channel (S-SCH).

3. The method of claim 1, wherein distances between the measurement windows are calculated based on possible timings of neighbor cell reference and synchronization symbols relative to a serving cell timing.

4. The method of claim 1, wherein the measurement windows have equal lengths within one measurement period.

5. The method of claim 1, wherein distances between measurement windows within the measurement period are determined based on the length of the measurement period, such that the distances are reduced when the measurement period is reduced and increased when the measurement period is increased.

6. A mobile communications receiver, adapted to receive signal strength measurement data from at least one base station during at least part of a measurement period, wherein the signal strength measurement data comprises at least one of reference symbols and synchronization symbols, said receiver comprising:
   a signal power estimation unit adapted to compute at least one average signal strength value based on at least part of the signal strength measurement data received during the measurement period; and
   a control unit adapted to control the receiver to receive signal strength measurement data during at least three time-wise non-equidistant measurement windows during each measurement period, and to determine a length of the measurement period based on a state of the mobile communications receiver.

7. The receiver of claim 6, wherein the synchronization symbols are received on at least one of a primary synchronization channel (P-SCH) and a secondary synchronization channel (S-SCH).

8. The receiver of claim 6, wherein the control unit is adapted to calculate distances between the measurement windows based on possible timings of neighbor cell reference and synchronization symbols relative to a serving cell timing.

9. The receiver of claim 6, wherein the measurement windows have equal lengths within one measurement period.

10. The receiver of claim 6, wherein the control unit is adapted to determine distances between measurement windows within the measurement period based on the length of the measurement period, such that the distances are reduced when the measurement period is reduced and increased when the measurement period is increased.

* * * * *